Figure 1:
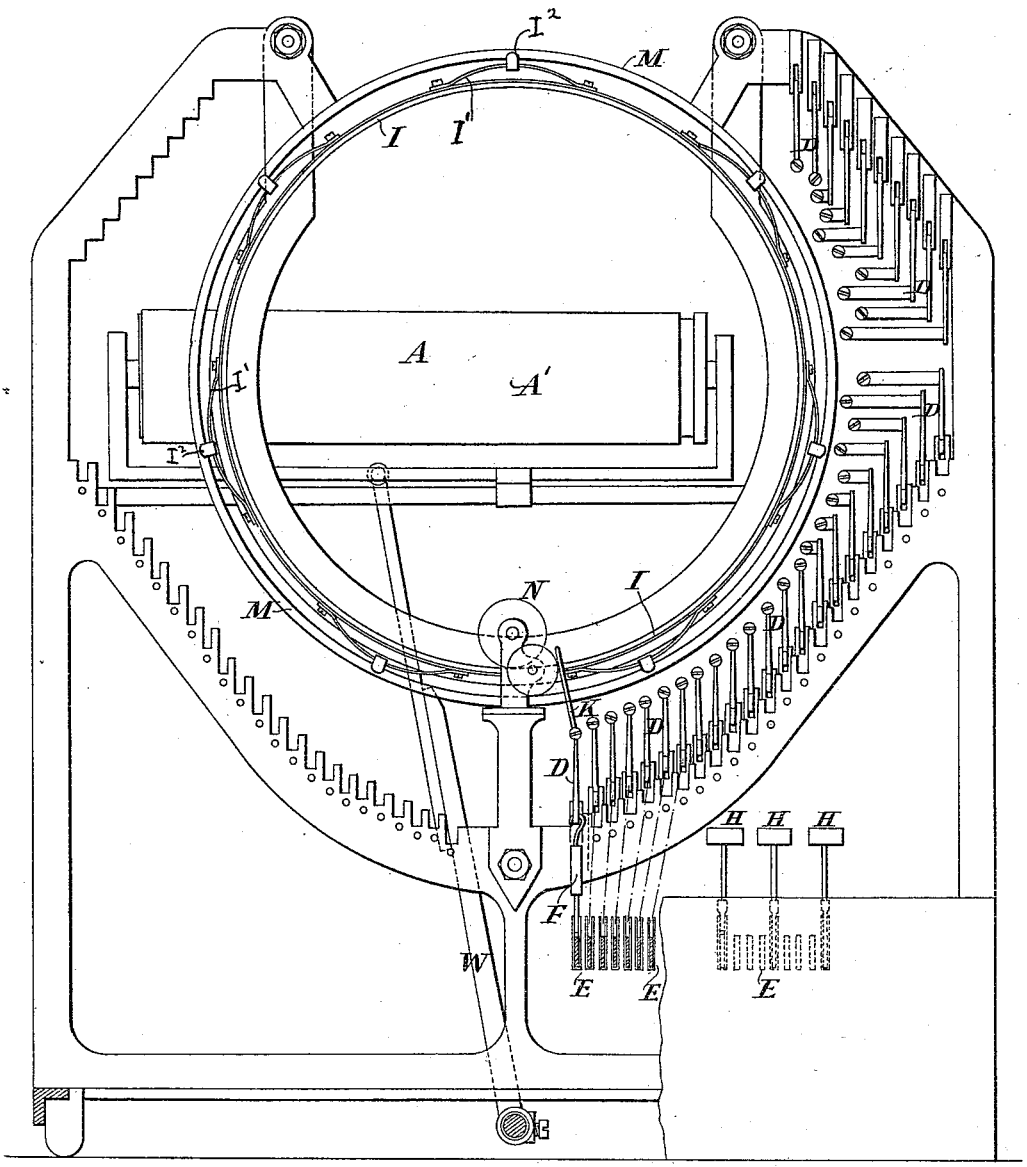

(No Model.)  8 Sheets—Sheet 1.

A. H. HUTH.
TYPE WRITING MACHINE.

No. 427,173. Patented May 6, 1890.

Witnesses
B. Miller,
C. W. Brooke

Inventor
Alfred Henry Huth,
By his Attorneys,
Baldwin Davidson & Wight

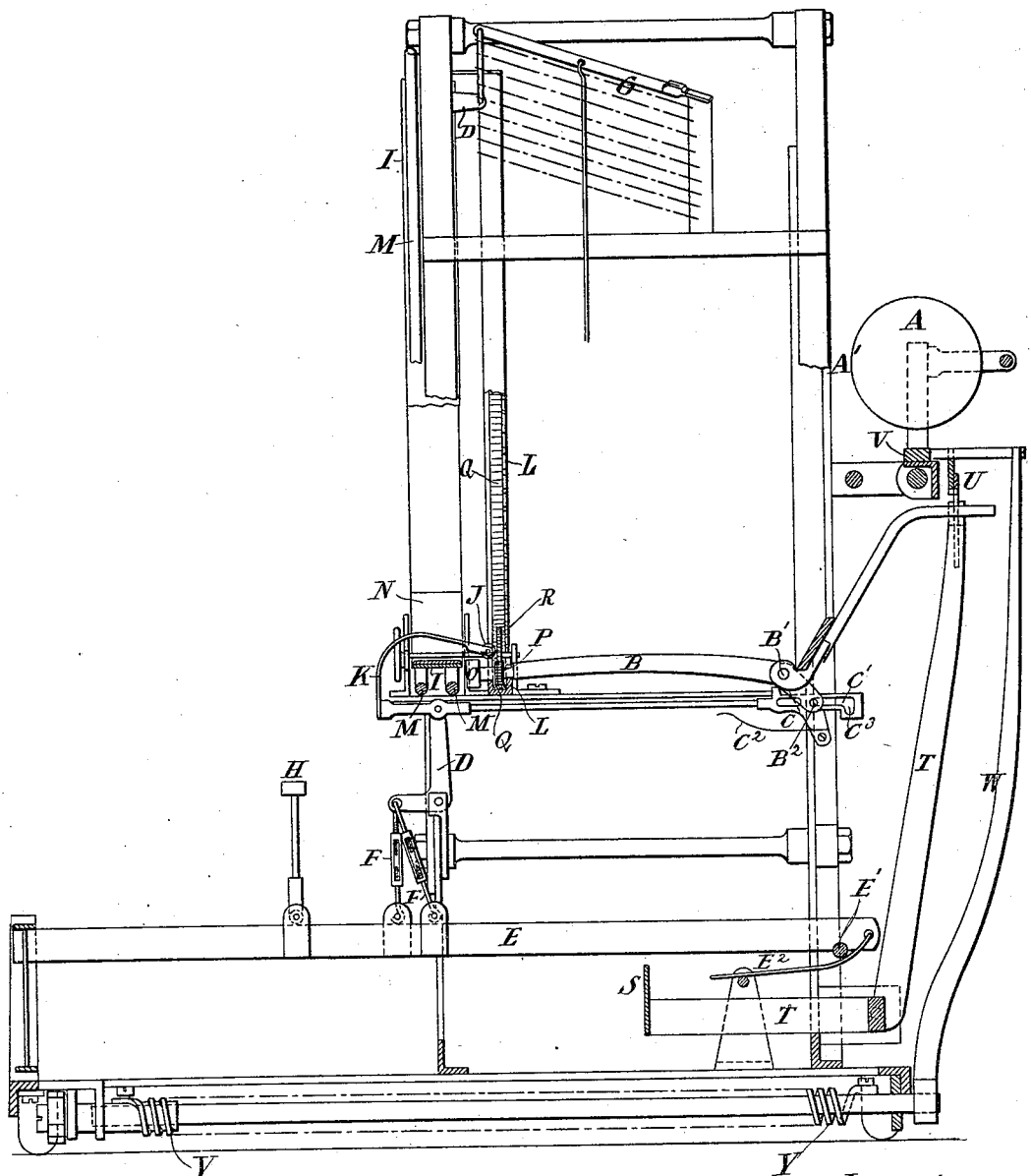

(No Model.) 8 Sheets—Sheet 3.
A. H. HUTH.
TYPE WRITING MACHINE.
No. 427,173. Patented May 6, 1890.
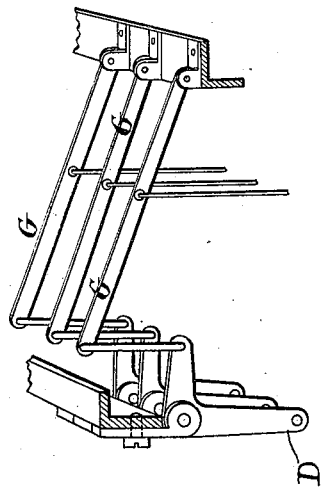
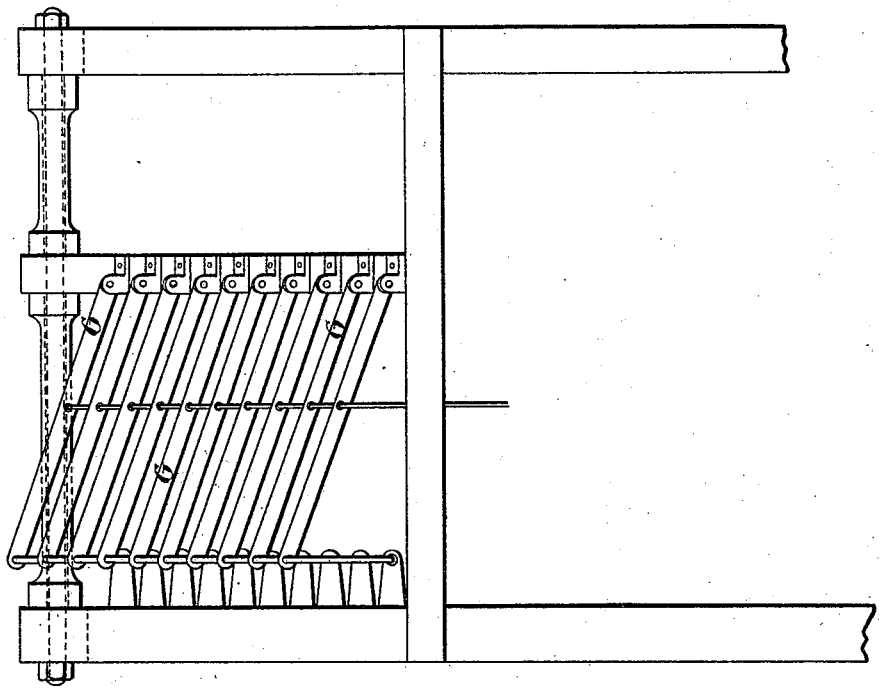
Witnesses  Inventor (No Model.) 8 Sheets—Sheet 4.
A. H. HUTH.
TYPE WRITING MACHINE.
No. 427,173. Patented May 6, 1890.
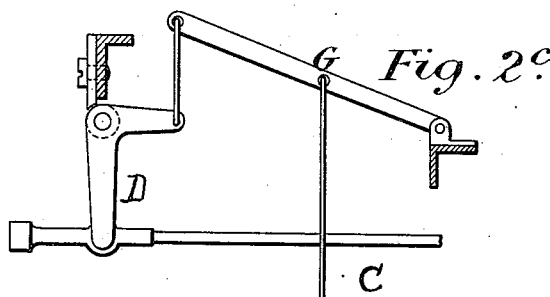
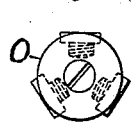
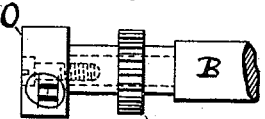
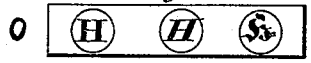
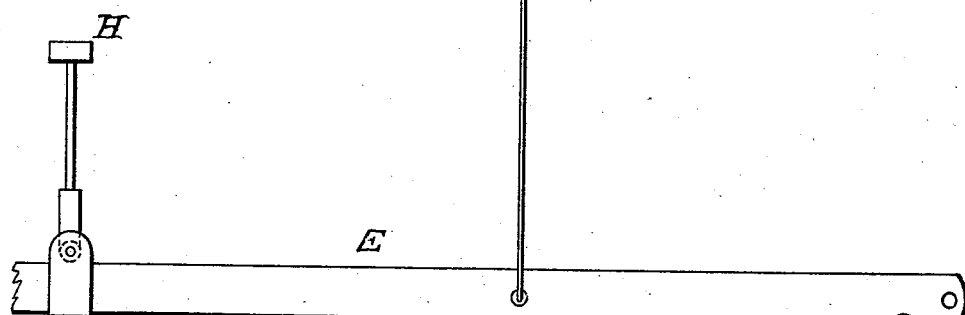

(No Model.) 8 Sheets—Sheet 5.

A. H. HUTH.
TYPE WRITING MACHINE.

No. 427,173. Patented May 6, 1890.

Witnesses
B. Miller
C. W. Brooke

Inventor
Alfred Henry Huth,
By his Attorneys,
Baldwin Davidson & Wight (No Model.) 8 Sheets—Sheet 6.
A. H. HUTH.
TYPE WRITING MACHINE.
No. 427,173. Patented May 6, 1890.
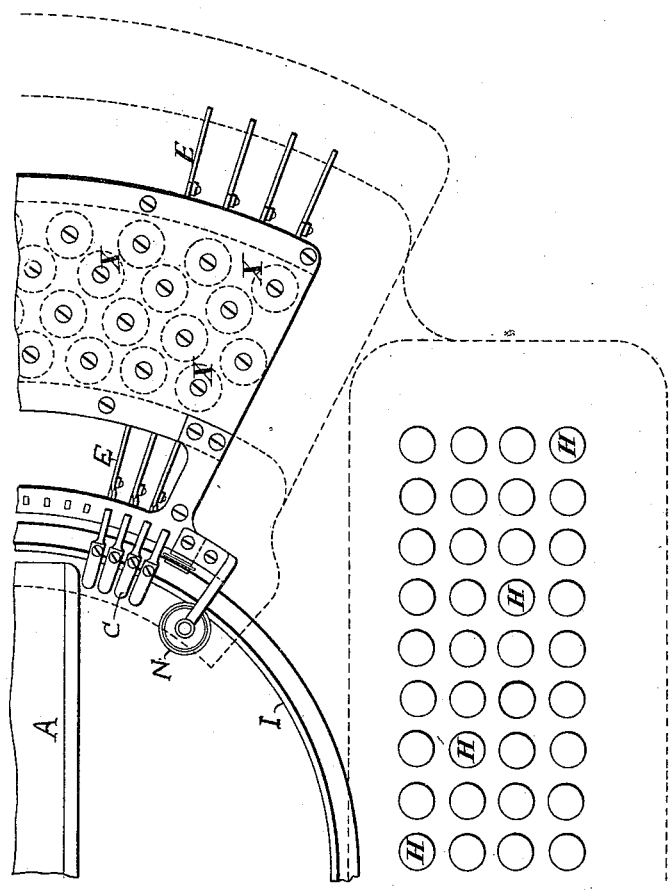

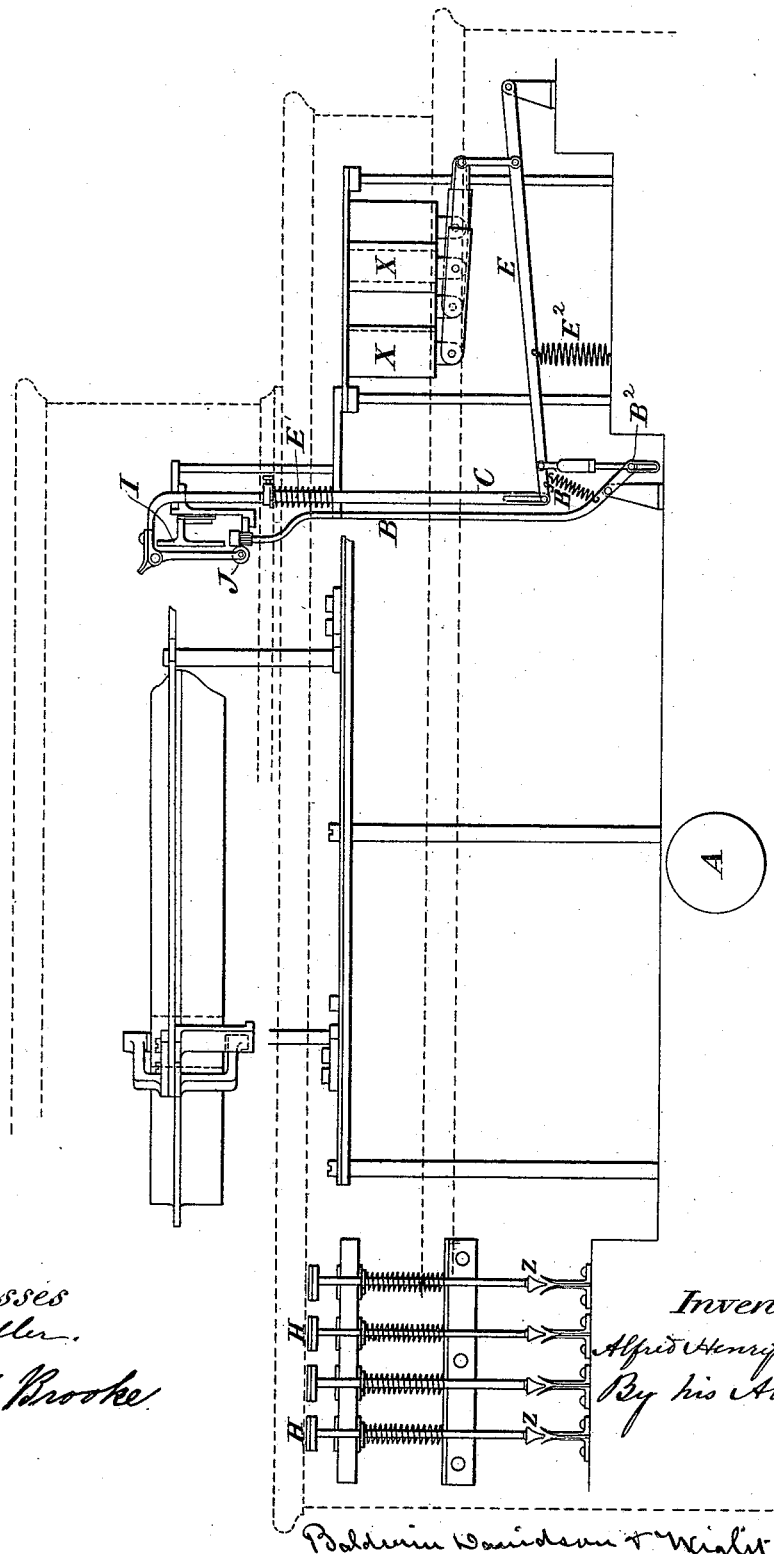

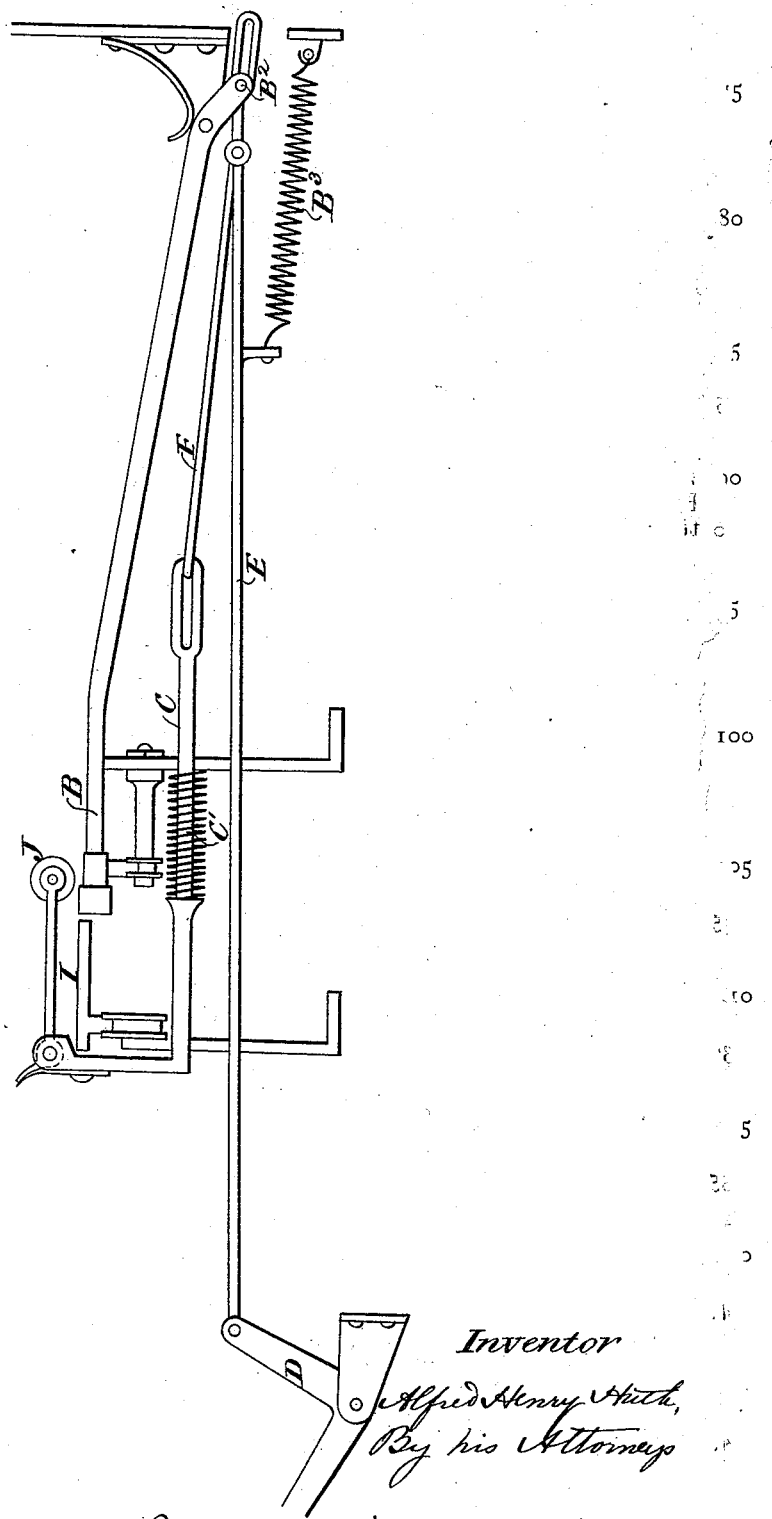

UNITED STATES PATENT OFFICE.

ALFRED H. HUTH, OF ENNISMORE GARDENS, COUNTY OF MIDDLESEX, ENGLAND.

TYPE-WRITING MACHINE.

SPECIFICATION forming part of Letters Patent No. 427,173, dated May 6, 1890.

Application filed April 22, 1889. Serial No. 308,127. (No model.) Patented in England July 7, 1888, No. 9,923.

*To all whom it may concern:*

Be it known that I, ALFRED HENRY HUTH, gentleman, a subject of the Queen of Great Britain, residing at Bolney House, Ennismore Gardens, in the county of Middlesex, England, have invented certain new and useful Improvements in Type-Writing Machines, (for which I have received Letters Patent in Great Britain, No. 9,923, dated July 7, 1888,) of which the following is a specification.

My improvements have mainly for their object to so construct type-writers that the writing as it progresses shall be fully exposed to the view of the operator. To effect this I dispense with the ordinary inking tape or ribbon now in common use and cause each type (which is carried, as usual, at the end of a lever-arm) to be inked by a small inked roller passed over its face each time that it is used. The axes of the lever-arms I range at equal distances apart in a segment of a circle, preferably somewhat larger than a semicircle, with the lever-arms turning in planes radial to the center of this circle, so that they may strike radially onto the central point. The paper to be printed on is carried, as usual, by a cylinder, which is traversed a distance endwise after the depression of each finger-key, and is at the end of each line brought back to its normal position and turned a short distance on its axis, as is usual. The cylinder carrying the paper may be at the top of the machine, and the circle in which the axes of the lever-arms are ranged be in a vertical plane parallel with the longitudinal axis of the cylinder, and not far from it, and the finger-keys may be placed at the front, so that the operator faces the side of the cylinder which is struck by the type and has an uninterrupted view of this cylinder, the type-lever arms being normally at right angles to the cylinder (or approximately so) and not obstructing his view; or in place of the cylinder being at the top it may be at the bottom, and the circle in which the axes of the levers are ranged be in a horizontal plane and so arranged that the levers strike down onto the top of the cylinder. With this construction there would be an uninterrupted view of the top of the cylinder from the opening between the two ends of the circular segment, and the finger-keys might be placed at this point. This construction is well adapted for being used when the type-arms have movement given to them by electro-magnets and the finger-keys operate contact mechanism for passing electric currents to the magnet-coils. Each time that any one or other of the type-lever arms is used I cause the small inking-roller on its end which is to ink the type to be drawn over the face of the type before the lever starts into movement, and I also cause the roller to be drawn over an inked surface, so that the roller may be replenished with ink, and similarly when the type-lever has made its stroke and returned back to its normal position I cause the ink-roller to again pass over the face of the type. To give these movements to the ink-roller and to the type-arm, the axis of the inking-roller may be carried by an arm jointed to a slide which can be moved endwise to and fro in fixed guides, and the arm may be pressed downward by a spring to cause the roller to bear constantly either upon the face of the type or upon the inked surface which supplies ink to the roller. The slide is drawn in one direction each time that the finger-key used for operating it is depressed and is drawn back in the opposite direction when the finger-key is released. The slide may have a slotted link formed with or attached to it, and a continuation of the type-arm past the type-arm axis may carry a pin to enter this slot. Movement is transmitted to the slide or link on the depression of the finger-key, either by levers and links or by the action of an electro-magnet, each finger-key in this case being used to complete an electric circuit through the coils of one or other of the magnet-coils each time that it is depressed. By the movement of the slide the inking-roller is carried away from in front of the face of the type on the type-arm, the type-arm remaining at rest until the pin above-mentioned is at the end of the slot. The type-arm is then turned on its axis and the type carried by it made to strike against the paper. When the finger-key is released, the type-arm and slide are brought back by a spring or springs to their normal position. The same action takes place if the slide is moved endwise by a lever acted on by an electro-magnet.

In order that the inked surface over which the ink-rollers are made to roll each time that they are drawn back may be kept replenished with ink, I make it in the form of a ring, which may be revolved from time to time, so as to cause all parts of its surface to be moved past a roller which bears upon it and which is kept constantly supplied with ink, or is itself an ink-reservoir.

In order that a variety of type may be used in the machine, each type-arm is made to carry at its end a small roller, the circumference of which has three, four, or more different kinds of type projecting from it. The roller has a small toothed wheel on its axis, and the toothed wheels of all the small rollers on the type-arms are made to gear with a toothed segment, so that by moving the segment endwise more or less in one direction or the other any of the different types can be brought into use, all the type being changed simultaneously. The cylinder which carries the paper that is to be printed on may be traversed to and fro and turned a distance after the completion of each line in any ordinary way.

Figure 3:
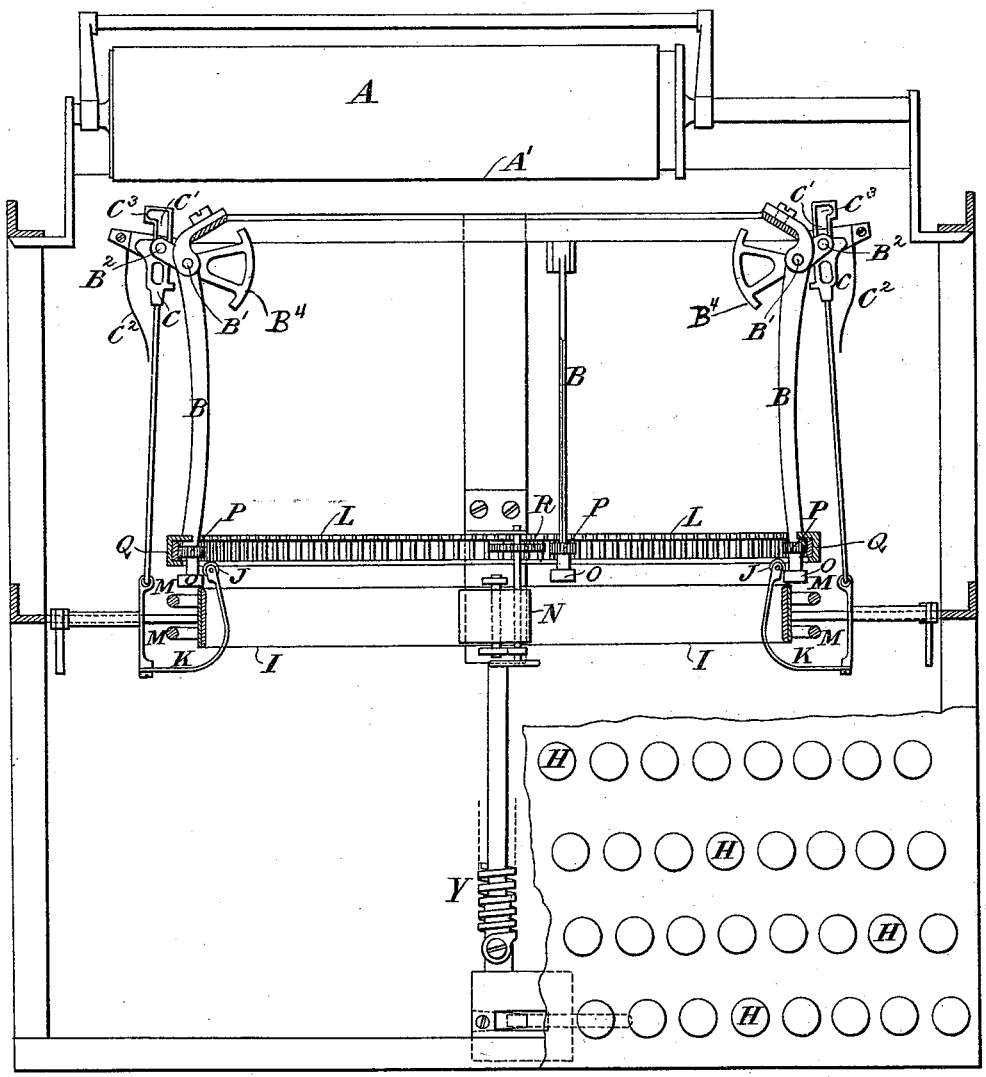

Figures 1, 2, and 3 of the drawings annexed show various views of a type-writer constructed according to my invention. Fig. 1 is a front elevation with many of the parts removed. Fig. 2 is a vertical section with the upper part in elevation; and Fig. 3 a plan view, mainly in section. Fig. 2$^a$ is a side elevation of the upper part only of the machine. Fig. 2$^b$ is a perspective view of some of the parts in this figure as seen from the side and rear. Fig. 2$^c$ shows an elevation of the parts used for giving movement to one of the uppermost type-arms. Fig. 4 is a plan view, and Fig. 5 a vertical section, of a modification, in which the cylinder that carries the paper is at the bottom of the machine, and in which electro-magnets are used for giving movement to the parts. Fig. 6 shows how mechanism—such as shown at Fig. 5—for giving movement to the type-arms can be operated by finger-key levers, similar to those shown in Figs. 1, 2, and 3. Fig. 7 is a side elevation, on a large scale, of the head end of one of the type-arms. Fig. 8 is an end view of one of the type-heads. Fig. 9 shows the three faces of this head.

In Figs. 1, 2, and 3, A is a cylinder, by which the paper to be printed on is carried, as in other type-writers.

B B are lever-arms carrying the type at their ends. They turn on axes B' in planes radial to a central point A', so that any one or other of the type can be caused to strike at one point on the side of the cylinder A.

B$^4$ are fixed quadrants used to give support to those lever-arms B which move in planes not much removed from the horizontal. For the lever-arms which move in planes approaching the vertical these supporting-quadrants are not required.

C C are slides for giving motion to the lever-arms B. There is one such slide for each arm. A pin B$^2$ on a continuation of the arm past the axis B' enters a slot C', formed in one end of each slide, while the opposite end of the slide is coupled to a crank-lever D.

E E are a series of horizontal parallel lever arms, to which the several crank-levers D are coupled by links F. The crank-levers used for giving motion to the uppermost type-lever arms cannot conveniently be coupled directly by links to any of the horizontal lever E, and are therefore shown to be connected to intermediate lever-arms G, and these are coupled by links to the levers E. The lever E turn on a fulcrum E' at their rear end, and normally are held up into a horizontal position by springs E$^2$.

H H are finger-keys by which the front ends of any one or other of the horizontal levers E can be depressed.

I is a narrow cylinder lined on the inside with a pad carrying ink.

J J are inking-rollers carried by spring wires K from the slides C.

L is a fixed ring with notches cut in for the ends of the type-levers B to lie in, one for each lever.

When a finger-key is depressed, it depresses the front end of one of the horizontal levers E, and thereby turns the crank-lever D, to which this lever is coupled, and so gives an endwise movement to one of the slides C. During the first part of the endwise movement of the slide the inking-roller J is carried over the face of the type and passes onto the ink-pad. When the inking-roller has passed over the type, the end of the slot C' in the slide C comes up to the pin B$^2$ on the continuation of the lever-arm B. The further movement of the slide then causes the lever to turn on its axis and causes the type on the end of the lever-arm to strike against the paper carried by the cylinder A. At the same time the rear end of the slide is pressed upward by a spring C$^2$, so that the pin B$^2$ passes into a short branch slot C$^3$, which is at right angles to the slot C'. When the pressure on the finger-key is released, the parts return to their former positions. The lever-arm B is made to return during the first part of the backward movement by reason of the pin B$^2$ then lying in the branch slot C$^3$, and when the arm has completed its movement it is retained by the pin B$^2$ passing into the slot C' as the slide continues its backward movement. To insure that the pin B$^2$ shall pass from the branch slot C$^3$ at the proper time, the arm B at the end of its return movement is made to strike against the slide and to move it against the pressure of the spring C$^2$. As the slide completes its return movement, the inking-roller J is carried off the inking-cylinder I and over the type on the end of the arm B.

The inking-cylinder I is, as shown, capable of being turned in fixed ring-guides M. It has spring projections I' standing out from it at intervals. These carry blocks I$^2$, which bear against and fit to the fixed rings M. Whenever the inking-cylinder requires to have fresh ink supplied to its surface, it has one or two turns given to it and then receives ink from an ink-roller N, which is charged with ink and is made to bear upon it.

When it is desired that the machine shall be capable of printing in two or more varieties of type, each type-arm is, as shown, made to carry at its end a small roller O, with two, three, or more kinds of type projecting from it. On each roller is a pinion P, which, when the type-arm is in its normal position, gears with teeth which project inwardly from a ring Q, which can be revolved between guides, as shown. R is a pinion also gearing with this circular toothed rack. On its spindle it has a small head, by which it can be turned to cause the rack to turn in its guides. By moving the rack more or less in one direction or the other any one or other of the sets of type on the type-rollers O can be brought into acting position.

As before stated, any ordinary means may be used for traversing to and fro the cylinder A, which carries the paper, and for giving to it a turning movement after the completion of each line. In the drawings the mechanism shown as being used for this purpose is that used in what is known as the "caligraph machine." In it the depression of any one or other of the horizontal levers E depresses a bar S, carried by one arm of a crank-lever T, the other arm of which carries a tooth, which, as the lever is rocked, passes from one of the toothed racks U to another. The racks are upon the sliding carriage V, which supports the cylinder A. The carriage is moved endwise in one direction by the coiled spring Y, its movement being controlled by the racks in the well-known manner, and when a new line is to be commenced is brought back against the force of the spring.

In the modification of the machine shown at Figs. 4 and 5 electro-magnets are used for giving motion to the parts. The type-arms B stand normally in a vertical position, instead of in a horizontal position, and the cylinder A, which carries the paper, is at the bottom, instead of near the top, of the machine. Each slide C is shown to be drawn in one direction by a lever E, and in the opposite direction by a coiled spring E'. Similarly a pin $B^2$ on the tail end of the type-arm B enters a slot in a link coupled to the lever E, and is by this link drawn in one direction, while a coiled spring $B^3$ draws it in the opposite direction. The lever E is coupled by a link to the armature of one of the electro-magnets X, which is able to draw it in one direction, while a spring $E^2$ draws it in the opposite direction. In this way whenever motion is given to one of the levers E by one of the electro-magnets the ink-roller J, carried by the slide C, is moved over and inks the type at the end of the type-arm, and is carried onto the inking-cylinder I, and the type-arm is made to strike its blow. Conversely, when the lever E is drawn by the spring $E^2$, the type-arm at once returns to its normal position before the inking-roller passes off from the inking-cylinder I, just as in the arrangement previously described with reference to Figs. 1, 2, and 3.

H H are the finger-keys, and Z Z electrical contact apparatus below each key. When any one or other of the finger-keys is depressed, an electrical circuit is completed through the coils of one of the magnets, and the type-arm which this magnet actuates is made to strike its blow.

In Fig. 6, D is a crank-lever, which, as in the construction shown at Fig. 1, can be rocked by the depression of a finger-key.

B is a type-arm with a pin $B^2$ on its tail end entering a slot in a link E, coupled to the lever D.

C is the slide pressed in one direction by a spring C', and drawn in the opposite direction by a pin on a link F entering a slot formed in it, as shown, the link F being itself coupled to the link E.

J is the inking-roller and I the inking-cylinder.

When a finger-key is depressed and the crank-lever D draws the link E endwise, the spring C' is free to press the slide C endwise in a direction to carry the inking-roller onto the inking-cylinder I. The link E then commences to act upon the pin $B^2$ on the tail end of the lever B and causes the type-arm to strike its blow. When the link E is allowed to be drawn back in the opposite direction, the slide C at first remains at rest, while the type-arm is caused to return to its normal position by the action of a spring $B^3$. Afterward the pin of the link F comes to the end of the slot in the slide C, and then draws this slide into the position shown in the drawings.

What I claim is—

1. The combination, substantially as hereinbefore set forth, of the main frame, the pivoted type-arms, the slides slotted at their tail ends, the projections on the tail ends of the type-arms extending into the slots of the slides, the inking-rollers connected with the slides, the finger-key levers, and connections between the finger-key levers and the slides.

2. The combination, substantially as hereinbefore set forth, of the paper-carrying cylinder A, the type-arms B, arranged radially, the slides or links C, the finger-key levers from which the slides or links receive movement, the inking-rollers J, carried by the slides or links, and the inking-cylinder I.

3. The combination, substantially as hereinbefore set forth, of the main frame, the pivoted type-arms mounted therein, the slides connected at their tail ends to the type-arms, the inking-rollers mounted on the opposite ends of the slides, the inking-cylinder, the finger-key levers, and connections between the finger-key levers and the slides.

4. The combination, substantially as hereinbefore set forth, of the main frame, the horizontally-pivoted type-arms, the slides slotted at their rear ends and engaging with the type-arms, the inking-rollers mounted on the slides, bell-crank levers to which the slides are connected, the finger-key levers, and connections between these levers and the bell-crank levers.

5. The combination, substantially as hereinbefore set forth, of the main frame, the type-arms arranged radially in the arc of a circle, the slides or links arranged on the outer sides of the type-arms and connected therewith, the inking-rollers carried by the slides or links, and the inking cylinder or pad I, over which the rollers are caused to move by the slides.

6. The combination, substantially as hereinbefore set forth, of the main frame, the type-arms, the slides or links connected therewith, the finger-key levers, connections between the finger-key levers and the slides, and the inking-rollers actuated by the slides.

7. The combination, substantially as hereinbefore set forth, of the main frame, the type-arms, the finger-key levers, the slides connected therewith, connections between the finger-key levers and the slides and between the type-arms and the slides, the inking-rollers connected with and actuated by the slides in advance of the actuation of the type-arms by the slides, substantially as specified.

ALFRED H. HUTH.

Witnesses:
HERBERT E. DALE,
W. SHERWOOD.
*Both of 17 Gracechurch Street, London, E. C.*